United States Patent
Caponi et al.

(10) Patent No.: US 10,482,133 B2
(45) Date of Patent: Nov. 19, 2019

(54) CREATING AND EDITING DOCUMENTS USING WORD HISTORY

(71) Applicant: INTERNATIONAL BUSINESS MACHINES CORPORATION, Armonk, NY (US)

(72) Inventors: Kiera Caponi, Poughkeepsie, NY (US); Michael E. Gildein, II, Wappingers Falls, NY (US); Steven P. LaFalce, Salt Point, NY (US); James A. O'Connor, Ulster Park, NY (US); William G. White, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 95 days.

(21) Appl. No.: 15/258,012

(22) Filed: Sep. 7, 2016

(65) Prior Publication Data

US 2018/0067911 A1    Mar. 8, 2018

(51) Int. Cl.
*G06F 16/93* (2019.01)
*G06F 17/22* (2006.01)

(52) U.S. Cl.
CPC .......... *G06F 16/93* (2019.01); *G06F 17/2205* (2013.01); *G06F 17/2229* (2013.01)

(58) Field of Classification Search
CPC ........................... G06F 17/24; G06F 17/30864
See application file for complete search history.

(56) References Cited

U.S. PATENT DOCUMENTS

| | | | |
|---|---|---|---|
| 5,890,103 A | 3/1999 | Barus | |
| 6,278,992 B1* | 8/2001 | Curtis | G06F 16/2237 707/711 |
| 6,538,673 B1* | 3/2003 | Maslov | G06F 17/2229 715/853 |
| 7,478,092 B2* | 1/2009 | Warburton | G06F 17/2765 |

(Continued)

OTHER PUBLICATIONS

Pheanis et al., "Context-Sensitive Spellchecking for Programming Languages," Computers and Their Applications (CATA-99), Proceedings of the {ISCA},14th International Conference, Cancun, Mexico, Apr. 7-9, 1999, pp. 342-345.

*Primary Examiner* — Scott T Baderman
*Assistant Examiner* — Benjamin Smith
(74) *Attorney, Agent, or Firm* — Cantor Colburn LLP; Steven Chiu

(57) ABSTRACT

Embodiments include methods, and computing systems, and computer program products for creating and editing documents. Aspects include creating a new document by a user using an interactive content manager system, and selecting one or more existing documents related to new document from a content database by user using a content source selection interface. Aspects also include performing content unit mining on the existing documents to extract a set of existing content units, and on the new document to extract a set of new content units, respectively, by a content unit mining and extraction module. Aspects further include comparing set of existing content units and the set of new content units to obtain a set of updated content units using a content unit comparison module, and updating the new document using the set of updated content units by the user using an interactive content manager module.

20 Claims, 5 Drawing Sheets

(56) References Cited

U.S. PATENT DOCUMENTS

| | | | | |
|---|---|---|---|---|
| 7,711,676 B2* | 5/2010 | Stuhec | G06F 16/258 | 707/783 |
| 7,818,342 B2* | 10/2010 | Stuhec | G06Q 10/10 | 707/777 |
| 7,937,281 B2* | 5/2011 | Miller | G06Q 10/06 | 705/7.12 |
| 8,805,823 B2* | 8/2014 | Nitz | G06F 16/285 | 707/722 |
| 8,863,153 B2* | 10/2014 | Thollot | G06Q 30/02 | 705/14.53 |
| 8,977,540 B2* | 3/2015 | Yasin | G06N 7/00 | 704/9 |
| 9,471,872 B2* | 10/2016 | Anand | G06N 5/02 | |
| 9,489,853 B2* | 11/2016 | Sherman | G09B 5/00 | |
| 9,547,994 B2* | 1/2017 | Sherman | G09B 5/00 | |
| 2002/0156803 A1* | 10/2002 | Maslov | G06F 17/2229 | 715/234 |
| 2003/0014448 A1 | 1/2003 | Castellanos et al. | | |
| 2005/0049990 A1* | 3/2005 | Milenova | G06F 16/284 | 706/48 |
| 2006/0075345 A1* | 4/2006 | Sherman | G09B 5/00 | 715/707 |
| 2006/0106746 A1* | 5/2006 | Stuhec | G06F 16/258 | |
| 2006/0106755 A1* | 5/2006 | Stuhec | G06Q 10/10 | |
| 2006/0235732 A1* | 10/2006 | Miller | G06Q 10/06 | 705/7.23 |
| 2007/0022115 A1* | 1/2007 | Warburton | G06F 17/2765 | |
| 2008/0065630 A1* | 3/2008 | Luo | G06F 16/258 | |
| 2008/0065633 A1* | 3/2008 | Luo | G06F 16/9535 | |
| 2008/0195388 A1 | 8/2008 | Bower et al. | | |
| 2009/0106206 A1* | 4/2009 | Sherman | G09B 5/00 | |
| 2010/0070539 A1* | 3/2010 | Bantlin | G06Q 30/06 | 707/803 |
| 2010/0262599 A1* | 10/2010 | Nitz | G06F 16/285 | 707/723 |
| 2010/0299370 A1* | 11/2010 | Otto | G01C 21/32 | 707/803 |
| 2011/0047166 A1* | 2/2011 | Stading | G06F 16/9558 | 707/749 |
| 2011/0087956 A1* | 4/2011 | Sherman | G09B 5/00 | 715/233 |
| 2011/0213637 A1 | 9/2011 | Rheaume | | |
| 2012/0102021 A1* | 4/2012 | Hill | G06F 16/7837 | 707/711 |
| 2012/0303357 A1* | 11/2012 | Yasin | G06N 7/00 | 704/9 |
| 2013/0021346 A1* | 1/2013 | Terman | G09B 5/08 | 345/467 |
| 2013/0067496 A1* | 3/2013 | Thollot | G06Q 30/02 | 719/318 |
| 2014/0006319 A1* | 1/2014 | Anand | G06N 5/02 | 706/12 |
| 2014/0283143 A1* | 9/2014 | Griffin | G06F 21/64 | 726/30 |
| 2015/0149447 A1* | 5/2015 | Nitz | G06F 16/285 | 707/722 |
| 2015/0186514 A1* | 7/2015 | Singh | G06F 16/951 | 707/709 |
| 2015/0186515 A1* | 7/2015 | Rao | G06F 16/951 | 707/610 |
| 2015/0186526 A1* | 7/2015 | Rao | G06F 16/583 | 707/610 |
| 2015/0186527 A1* | 7/2015 | Rao | G06F 16/9535 | 707/711 |
| 2015/0186528 A1* | 7/2015 | Rao | G06F 16/9535 | 707/710 |
| 2015/0317303 A1* | 11/2015 | Zhang | H04L 51/32 | 707/776 |
| 2016/0124613 A1* | 5/2016 | Finn | G06F 16/93 | 715/835 |
| 2016/0125144 A1* | 5/2016 | Gifford | G06F 16/93 | 705/3 |
| 2016/0125169 A1* | 5/2016 | Finn | G06F 16/93 | 707/692 |
| 2016/0232246 A1 | 8/2016 | Rau | G06Q 50/184 | |
| 2017/0109360 A1* | 4/2017 | Hill | G06F 16/7837 | |
| 2017/0132311 A1* | 5/2017 | Balinsky | G06F 16/353 | |
| 2017/0235537 A1* | 8/2017 | Liu | G06F 3/1454 | 715/759 |
| 2017/0310752 A1* | 10/2017 | Knothe | H04L 67/1097 | |
| 2017/0310753 A1* | 10/2017 | Knothe | H04L 67/1097 | |
| 2018/0067911 A1* | 3/2018 | Caponi | G06F 17/2205 | |

* cited by examiner

CREATING AND EDITING DOCUMENTS USING WORD HISTORY

BACKGROUND

The present disclosure relates generally to creating and editing documents, and more particularly to methods and systems for creating and editing documents using word history.

Rapidly creating accurate, relevant, and timely new technical information needed to describe, teach, and support new complex systems, such as new computer systems, can be a daunting challenge. Composing, editing, and producing what can be lengthy written material has always required time-consuming manual work to find and correct mistakes and duplication, ensure the completeness and accuracy of content, and to identify and add new and missing content.

Writing and publishing tools such as spelling, grammar, and plagiarism-identification checking have improved the productivity of reviewers, but more is needed, especially for more rapid analysis of complex documents where terminology and acronyms may not be incorporated into dictionaries of industry standard checking tools. Terms such as LAN, SAN, AIX, PHYPE, or PCI might be readily recognized by computer system users, but would unnecessarily be flagged as misspelled words.

Usually, a new document for a new product is generated based on certain related existing documents. The new product may include certain new features and may exclude some obsolete features, and a document creator needs a list of terms or words that highlight content changes between the existing documents and the new document.

Therefore, heretofore unaddressed needs still exist in the art to address the aforementioned deficiencies and inadequacies.

SUMMARY

In an embodiment of the present invention, a method of creating and editing documents include creating a new document by a user using an interactive content manager system, and selecting one or more existing documents related to the new document from a content database by the user using a content source selection interface. The method also includes performing content unit mining on each of the one or more existing documents to extract a set of existing content units and the new document to extract a set of new content units, respectively, by a content unit mining and extraction module. The method further includes comparing the set of existing content units and the set of new content units to obtain a set of updated content units using a content unit comparison module and updating the new document using the set of updated content units by the user using an interactive content manager module.

In another embodiment of the present invention, a computing system for creating and editing documents includes a content database storing product documents, documents obtained through internet search engines, and problem records, a content source selection interface configured to enable a user to select one or more existing documents from the content database, a memory storing computer executable instructions for the computing system, and a processor for executing the computer-executable instructions. When the computer executable instructions are executed by the processor, the computer-executable instructions cause the processor to create a new document by a user using an interactive content manager system, and select one or more existing documents related to the new document from the content database by the user using a content source selection interface. The computer-executable instructions also cause the processor to perform content unit mining on each of the one or more existing documents to extract a set of existing content units, and the new document to extract a set of new content units, respectively, by a content unit mining and extraction module. The computer-executable instructions further cause the processor to compare the set of existing content units and the set of new content units to obtain a set of updated content units using a content unit comparison module, and update the new document using the set of updated content units by the user using an interactive content manager module.

In yet another embodiment of the present invention, the present disclosure relates to a non-transitory computer storage medium. In certain embodiments, the non-transitory computer storage medium stores computer executable instructions. When these computer executable instructions are executed by a processor of a computer, these computer executable instructions cause the processor to create a new document by a user using an interactive content manager system, and select one or more existing documents related to the new document from a content database by the user using a content source selection interface. These computer-executable instructions cause the processor to perform content unit mining on each of the one or more existing documents to extract a set of existing content units, and the new document to extract a set of new content units, respectively, by a content unit mining and extraction module. These computer executable instructions also cause the processor to compare the set of existing content units and the set of new content units to obtain a set of updated content units using a content unit comparison module, and update the new document using the set of updated content units by the user using an interactive content manager module.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
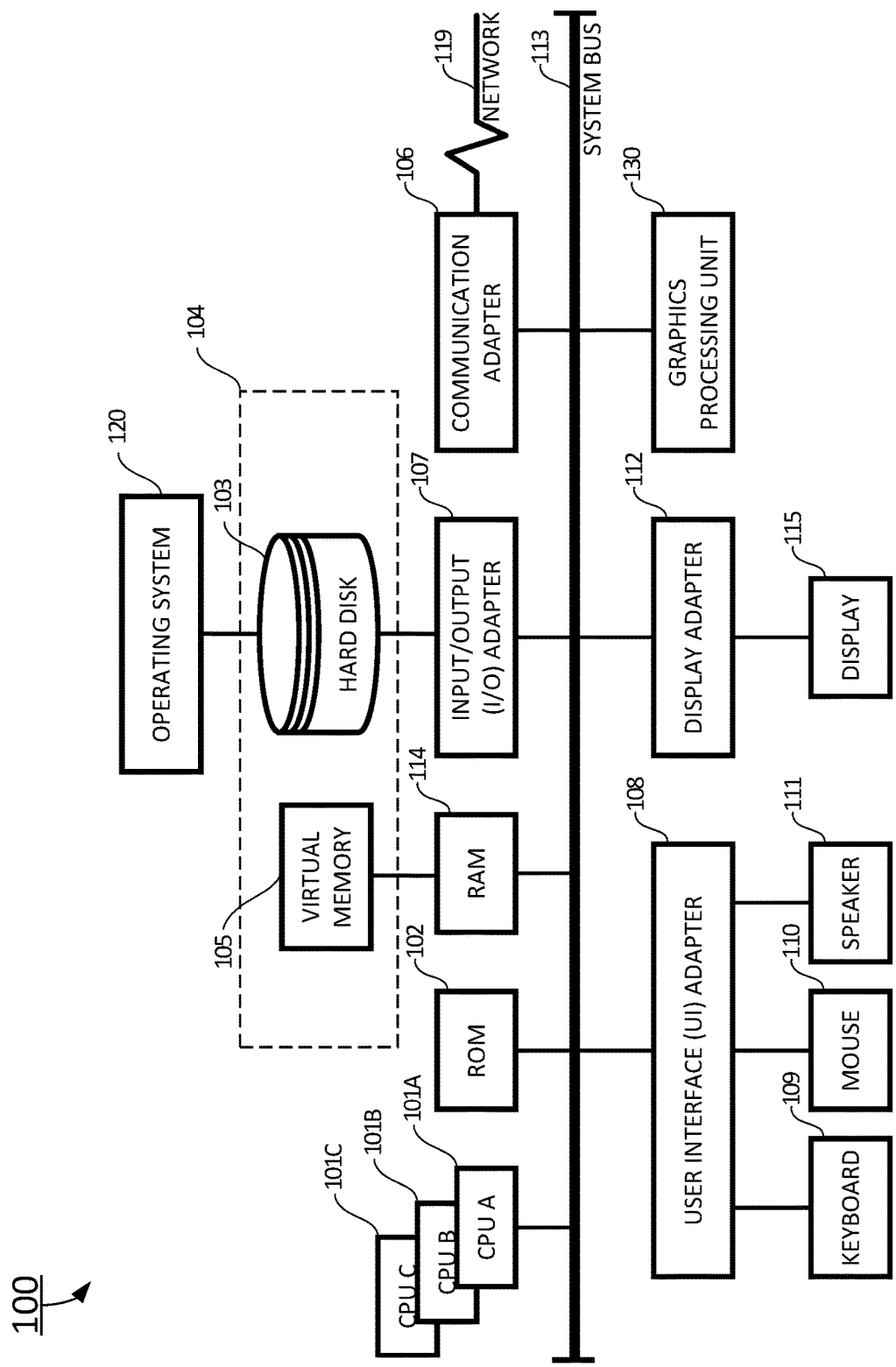
FIG. 1 is a block diagram of a computing system implementing the teachings herein according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that the same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The present disclosure will now be described more fully hereinafter with reference to the accompanying drawings FIGS. 1-5, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, an embodiment of a computing system 100 for creating and editing a new written document using word history and implementing the teachings herein. In this embodiment, the computing system 100 has one or more processors 101A, 101B, 101C, etc. (collectively or generically referred to as processor(s) 101). In one embodiment, each processor 101 may include a reduced instruction set computer (RISC) microprocessor. Processors 101 are coupled to a system memory 114 and various other components via a system bus 113. Read only memory (ROM) 102 is coupled to the system bus 113 and may include a basic input/output system (BIOS), which controls certain basic functions of the computing system 100.

FIG. 1 further depicts an input/output (I/O) adapter 107 and a communication adapter 106 coupled to the system bus 113. I/O adapter 107 may be a small computer system interface (SCSI) adapter that communicates with a hard disk 103 and/or virtual memory 105 or any other similar component. I/O adapter 107, hard disk 103, and the virtual memory device 105 are collectively referred to herein as mass storage 104. An operating system 120 for execution on the computing system 100 may be stored in mass storage 104. The communication adapter 106 interconnects bus 113 with an outside network 116 enabling the computing system 100 to communicate with other such systems. A screen (e.g., a display monitor) 115 is connected to system bus 113 by a display adaptor 112, which may include a graphics adapter to improve the performance of graphics intensive applications and a video controller. In one embodiment, the I/O adapters 107, the communication adapter 106, and the display adapter 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and the display adapter 112. A keyboard 109, a mouse 110, and one or more speakers 111 all interconnected to bus 113 via user interface adapter 108, which may include, for example, a Super I/O chip integrating multiple device adapters into a single integrated circuit.

In exemplary embodiments, the computing system 100 includes a graphics-processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the computing system 100 includes processing capability in the form of processors 101, storage capability including the system memory 114 and mass storage 104, input means such as the keyboard 109 and the mouse 110, and the output capability including the one or more speakers 111 and display 115. In one embodiment, a portion of the system memory 114 and mass storage 104 collectively store the operating system 120 to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

Usually, a new document for a new product is generated based on certain related existing documents. The new product may include certain new features and may exclude some obsolete features, and a document creator needs a list of terms or words that highlight content changes between the existing documents and the new document such that the newly added features are covered by the new documents, and obsolete features are removed from the new document.

Going over an existing document is very tedious and time-consuming. It is desirable to find a way to highlight the technical features of the newly created product and cover all areas. In a written paragraph of a document, not every word is equally important. For example, an excerpt of the introduction of "IBM zEnterprise EC12 (zEC12)" recites: "New technologies for cloud, big data, analytics, mobile devices and social media are redefining the way that businesses will be operating on and IT must be transformed to support these technologies. The shift can offer the opportunity to assess and improve the business model and interaction with the customers, partners and employees. To capitalize on this opportunity, organizations must be able to tap into their data and energize applications without going over budget and all the while keeping everything protected and secure." In this paragraph, words such as "cloud", "big data", "analytics", "mobile devices" and "social media" are subject matter significant to cover in a related document, but words such as "for", "and", "the", "that", "to" and "these" are not as significant.

In certain embodiments, the present disclosure relates to a method to create and edit a new written document using word history. In certain embodiments, word history is represented by a content unit, which is defined as subject matter significant words such as a single letter, combination of letters, a number, a symbol, a subject matter word, an acronym, a subject matter phrase, a subject matter expression, a token, opcode, a system name, a subsystem name, device name, a components name, or any combination of above.

Figure 2:
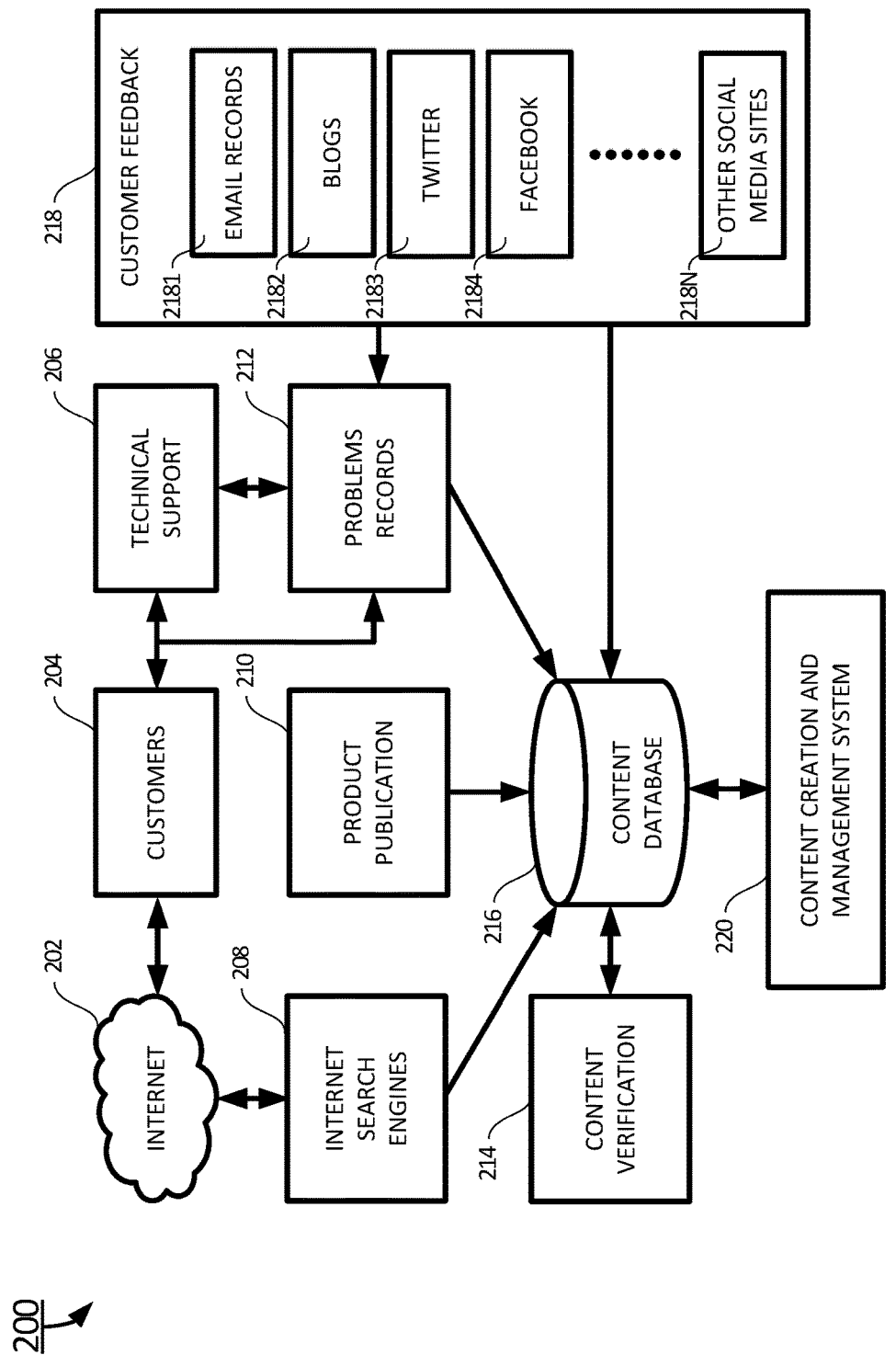
FIG. 2 is a block diagram of content sources for creating and editing a new written document according to certain embodiments of the present invention.
Figure 3:
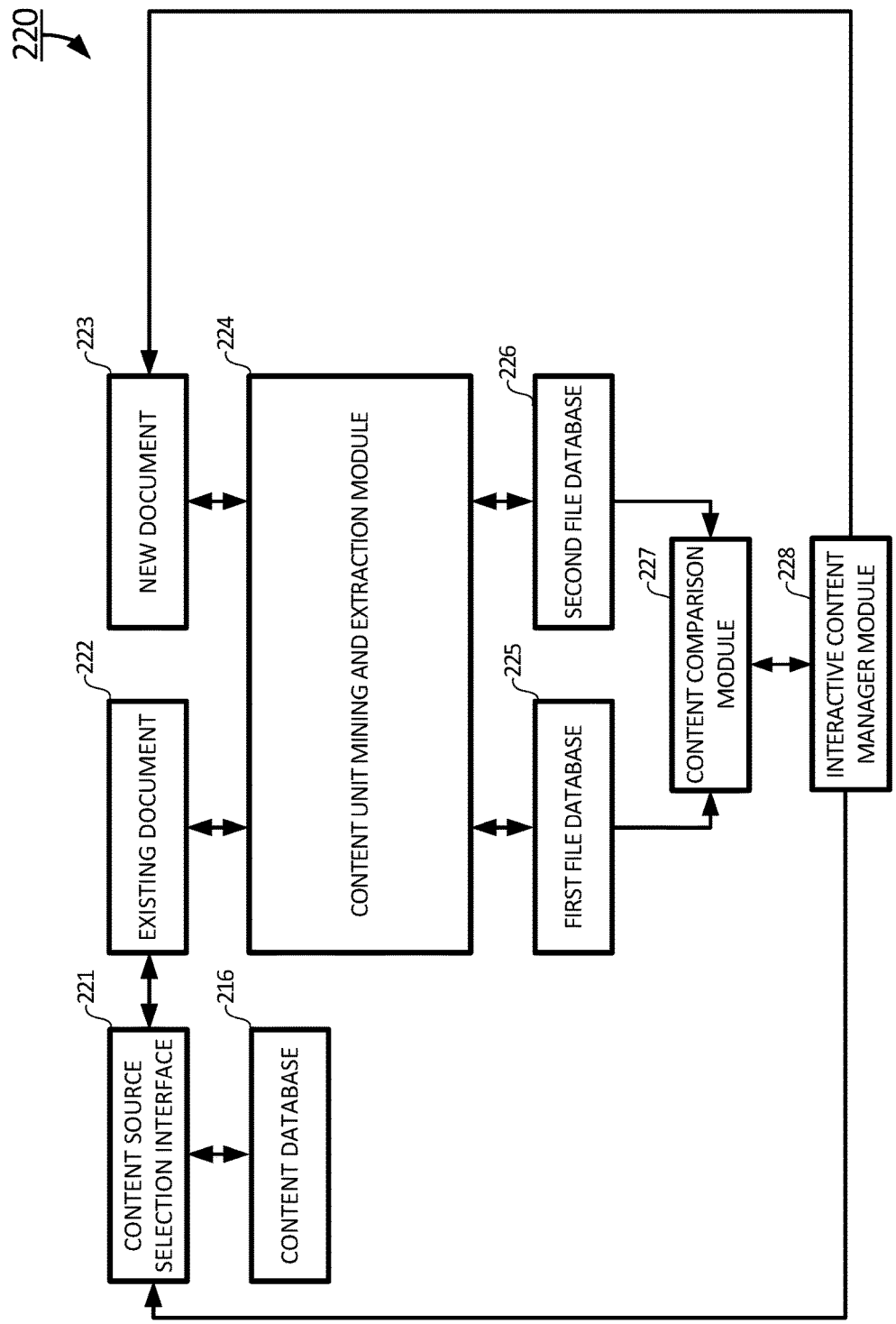
FIG. 3 is a block diagram of the content creation and management system for creating and editing the new written document according to certain embodiments of the present invention.

In an exemplary embodiment, the present invention relates to a computing system 200 for creating and editing a new written document using content units, as shown in FIGS. 2 and 3. The computing system 200 includes a content creation and management system 220, and a content database 216.

In certain embodiments, the content database 216 stores product documents 210, documents obtained through internet search engines 208, and problem records 212. The product documents 210 may include product design documents, marketing materials about the product, user's manuals, technical support manuals, maintenance manuals, and other product related literature, and these documents are usually provided by the manufacturer of the product. The documents obtained through internet search engines 208 may include documents provided by third parties, component suppliers, and original-equipment-manufacturers (OEM) etc. These documents usually reside in websites of the third parties, the component suppliers, and the OEM suppliers. These documents are obtained through various search engines over the Internet 202, such as Google, Yahoo, Baidu, Bing, and Sogou etc. The problem records 212 are very important resources for updating documents, and they reveal the shortcomings of existing documents and highlight the subject matter areas that require updates. In one embodiment, the problem records 212 may come from customers 204 directly. In another embodiment, the problem records 212 may come through technical support centers 206. The problem records 212 may also come in various forms of customer feedbacks 218. The customer feedbacks 218 may include email records/transactions 2181 from the customers. In one embodiment, the customer 204 may post one or more subject matter blogs 2182 describing some issues with the product, and sometimes with follow-up blog postings. In another embodiment, the customer 204 may post one or more twitts on Twitter 2183 describing some issues with the product while the issues exist, and sometimes with follow-up twitts interacting with other customers. In yet another embodiment, the customer 204 may post one or more subject matter posting on Facebook 2184 to discuss the issues with other customers. In certain embodiments, the customer 204 may also use many other social media websites 218N and applications. The customer feedback 218 is not limited to the sources of information listed above. Certain software modules may be developed to crawl through the Internet 202 and retrieve related information based on certain content units or keywords.

In certain embodiments, the customer feedback 218 may require a large amount of editing. The content database 216 may also include documents from a content verification 214, where the information and documents from the content verification 214 have been verified by the content verification 214, thus, requiring much less editing.

In exemplary embodiments, the content creation and management system 220 may include a content source selection interface 221, a content unit mining and extraction module 224, a first file database 225, a second file database 226, a content comparison module 227, and an interactive content manager module 228. The content source selection interface 221 is used to allow a user to select an existing document 222 from the content database 216. In one embodiment, the user uses the content source selection interface 221 to select a product document 210 from the content database 216. In another embodiment, the user uses the content source selection interface 221 to select a document 222 obtained from searches over the Internet 202. In yet another embodiment, the user uses the content source selection interface 221 to select a problem record 212 from customer feedback 218. The interactive content manager module 228 may be used by the user to refine, enhance, correct and improve a new document 223. In certain embodiments, the new document 223 may include at least one or more initial versions.

Figure 4:
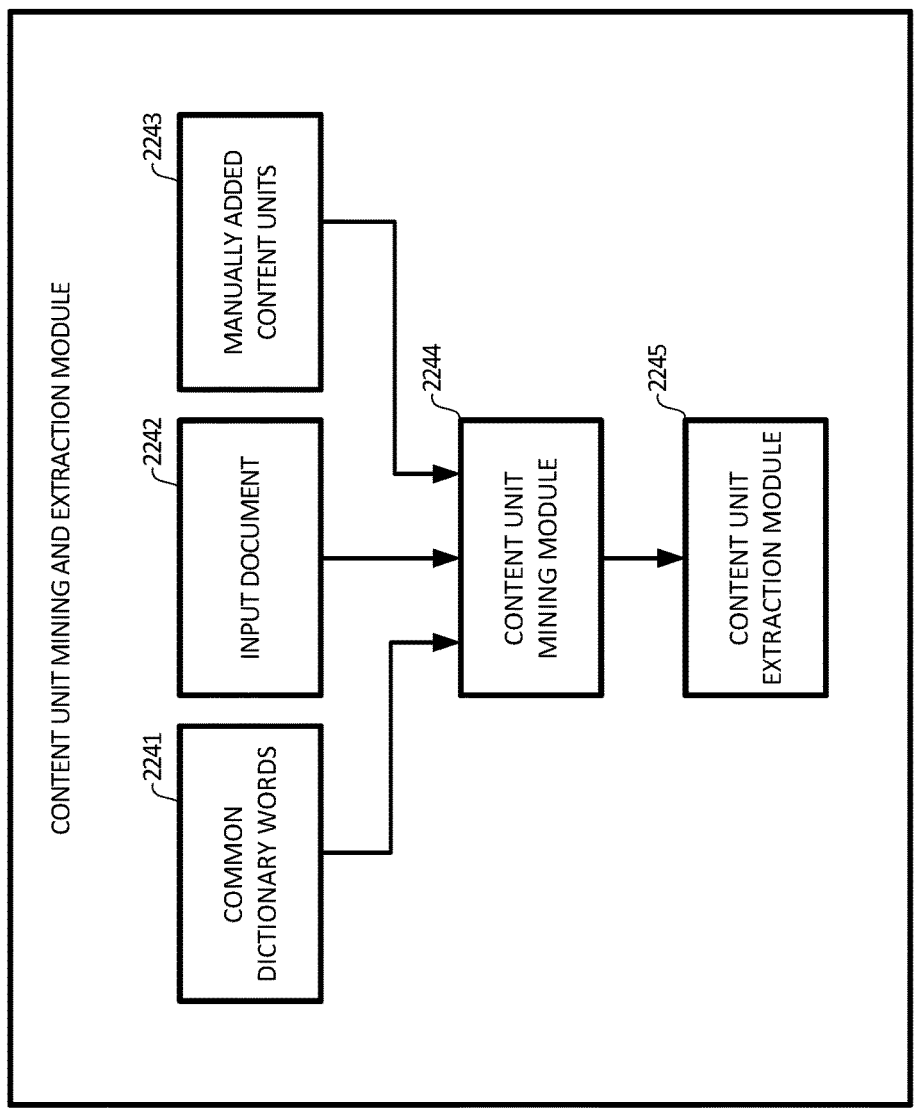
FIG. 4 is a block diagram of a content unit mining and extraction module of the content creation and management system according to certain embodiments of the present invention.

The content unit mining and extraction module 224 may be used to mine and extract content units from the existing document 222 and the new document 223. Referring now to FIG. 4, a block diagram of the content unit mining and extraction module 224 of the content creation and management system 220 is shown according to certain embodiments of the present invention. The content unit mining and extraction module 224 receives an input document 2242. The input document 2242 can be the existing document 222, or the new document 223. The input document 2242 forms an initial content unit collection. The content unit mining and extraction module 224 includes two additional information sources: a common dictionary words collection 2241, and manually added content units 2243. The common dictionary words collection 2241 is used to filter out certain words that are not subject matter significant such as the words: "for", "and", "the", "that", "to" and "these". This information source 2241 usually is stable, once they are in the content unit collection, they do not require much maintenance. On the other hand, the content units 2243 are manually added as the new document 223 develops. For example, when a computer hardware added a new feature such as Wi-Fi support over the previous version, the user may added a content unit Wi-Fi manually into the content unit collection such that when the user updates the new document 223, the content unit "Wi-Fi" becomes a reminder that Wi-Fi feature is to be added to the new document. On the other hand, when a computer hardware removed an old and obsolete feature such as floppy disk driver, the user may add a content unit "Floppy Disk Driver" manually into the content unit collection such that when the user updates the new document 223, the content unit "Floppy Disk Driver" reminds the user to remove relevant portion of the description of Floppy Disk Driver from the existing document 222 to form the new document 223.

Once the common dictionary words collection 2241 and manually added content units 2243 are added to the initial content unit collection, the content unit collection is sent to the content unit mining module to filter out the common dictionary words according to the common dictionary words collection 2241. After the content unit mining, the content unit collection is further sent to the content unit extraction module 2245 to extract content units related to the input document. During the content unit extraction, repeated content units are purged. During or after the purge, data metadata may be collected and stored for word history analysis. The data metadata is useful to the user. For example, a count of how many times a specific content unit appears in the document may reflect the importance of this content unit. For example, the existing document 222 may include 200 content units of "cloud computing system", only one is needed. Therefore, 199 content units of "cloud computing system" are removed from the content unit collection to further simplify the content unit collection. The manually added content units 2243 are added to the content unit collection. When the input document 2242 is the existing document 222, the content unit collection forms a set of existing content units as the output of the content mining and extraction module 224. When the input document 2242 is the new document 223, the content unit collection forms a set of new content units as the output of the content mining and extraction module 224.

In certain embodiments, the extracted existing content units are stored in the first file database 225, and the extracted new content units are stored in the second file database 226. The extracted existing content units in the first file database 225 and the extracted new content units in the second file database 226 are processed by the content comparison module 227 to obtain a set of updated content units. The set of updated content units highlights a skeleton of the significant differences between the existing document 222 and the new document 223. The skeleton of the significant differences between the existing document 222 and the new document 223 is used as a guideline for the interactive content manager module to update and edit the new document.

In certain embodiments, the present invention relates to a method of creating and editing new written document using the content unit. The method may include creating a new document 223 by a user using an interactive content manager system 228, and selecting an existing document 222 related to the new document 223 from a content database 216 by the user using a content source selection interface 221. The method may also include: performing content unit mining on each of the existing document 222 to extract a set of existing content units, and on the new document 223 to extract a set of new content units, respectively, using a content unit mining and extraction module 224. The method further includes comparing the set of existing content units and the set of new content units to obtain a set of updated content units using a content unit comparison module 227 and updating the new document 223 using the set of updated content units by the user using an interactive content manager module 228.

In certain embodiments, the method may include receiving an input document 2242 by the content unit mining and extraction module 224. The input document 2242 may be the existing document 222 or the new document 223. The method may also include adding a set of additional content units 2243 to the input document 2242 to form a content unit collection, and removing a set of common words 2241 from the content unit collection by a content unit mining module 2244. The set of common words 2241 includes common dictionary words used in the input document 2242 in a language of the input document. The input document 2242 may be in for example, but not limited to, English, French, German, or Chinese, and the common dictionary words for each language are vastly different. The method further includes refining the content unit collection by removing duplicated content units to form a set of existing content units when the input document is the existing document 222, and a set of new content units when the input document is the new document 223.

Figure 5:
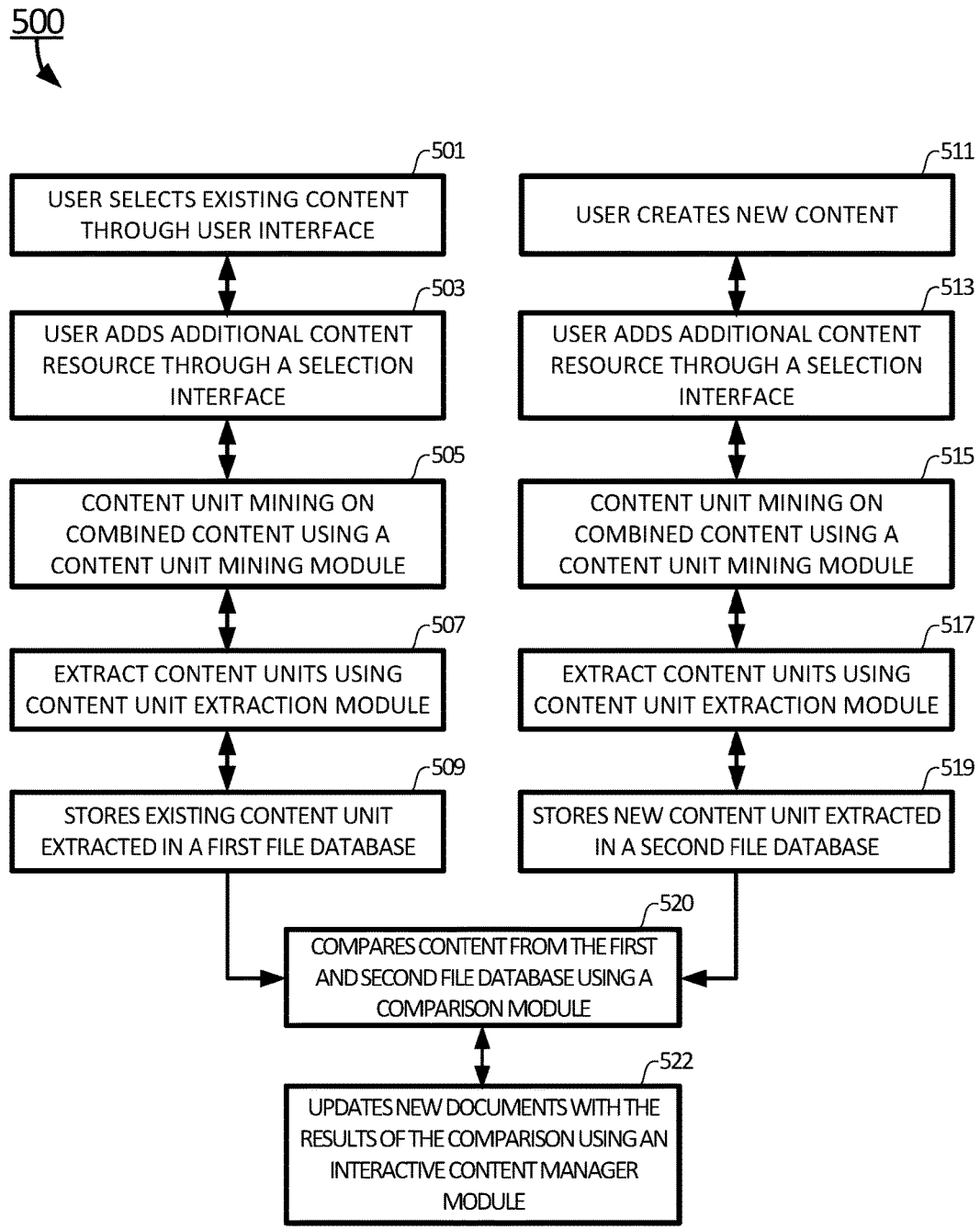
FIG. 5 is a flow chart of a method for creating and editing the new written document according to certain embodiments of the present invention.

Referring now to FIG. 5, a flow chart of a method 500 for creating and editing the new written document using content units is shown according to certain embodiments of the present invention. The method 500 has two branches in parallel: block 501 through block 509 for processing an existing document 222, and block 511 through block 519 for processing a new document 223.

At the beginning in block 511, a user creates the new document 223 using an interactive content manager system 228. The new document 223 forms an initial new content unit collection. At block 501, the user selects the existing document 222 that is related to the new document 223 from a content database 216 using a content source selection interface 221. The existing document 222 forms an initial existing content unit collection.

At block 503, the user may add an additional content resource to the initial existing content unit collection. At block 513, the user can add an additional content resource to the initial new content unit collection. The additional content resource includes a set of common words 2241 and additional content units 2243. The set of common words 2241 is used to remove common dictionary words from the existing content unit collection and the new content unit collection. The additional content units 2243 are added to the existing content unit collection and the new content unit collection manually by the user. At block 505, the existing content unit collection is processed by the content unit mining and extraction module 224 to remove common dictionary words from the existing content unit collection according to the set of common words 2241 added to the existing content unit collection. At block 515, the new content unit collection is processed by the content unit mining and extraction module 224 to remove common dictionary words from the new content unit collection according to the set of common words 2241 added to the new content unit collection.

At block 507, the existing content unit collection is further processed by the content unit mining and extraction module 224 to extract content units from the existing content unit collection to form the output of the content unit mining and extraction module 224 for the existing content unit collection. At block 517, the new content unit collection is further processed by the content unit mining and extraction module 224 to extract content units from the new content unit collection to form the output of the content unit mining and extraction module 224 for the new content unit collection. Repeated content units in the existing content unit collection and the new content unit collection are purged by a content unit extraction module 2245 of the content unit mining and extraction module 224 to simplify each of the existing content unit collection and the new content unit collection. At block 509, the output of the content unit mining and extraction module 224 for the existing content unit collection is stored in the first file database 225. At block 519, the output of the content unit mining and extraction module 224 for the new content unit collection is stored in the second file database 226.

At block 520, the existing content unit collection from the first file database 225, and the new content unit collection from the second file database 226 are compared by the content comparison module 227 to form a set of updated content units. This set of updated content units highlights a skeleton of the significant differences between the existing document 222 and the new document 223. The skeleton of the significant differences between the existing document 222 and the new document 223 is used as a guideline for the interactive content manager module 228 to update and edit the new document 223 in the block 522.

The present invention may be a computing system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or improvement over technologies found in the marketplace, or to enable others of ordinary skill in the art to understand the embodiments disclosed herein.

What is claimed is:

1. A computer-implemented method for creating and editing documents comprises:
   receiving, by a processor, a new document from a user via an interactive content manager system;
   receiving, by the processor, a selection of one or more existing documents from a content database from the user via a content source selection interface, wherein the one or more existing documents are related to the new document, wherein the content database comprises a plurality of problem records comprising customer feedback associated with any of the one or more existing documents, the customer feedback scraped directly from customer emails, blogs, or social media posts;
   identifying, by the processor and based on the scraped customer feedback, subject matter areas that require update within the one or more existing documents;
   performing, by the processor, content unit mining, using a common dictionary and at least one manually added content unit, on each of the one or more existing documents to extract a plurality of existing content units, and the new document to extract a plurality of new content units, respectively, wherein the at least one manually added content unit is used to add a description of a new feature to the new document or remove a description of an obsolete feature from the new document;
   comparing, by the processor, the plurality of existing content units and the plurality of new content units, to obtain a plurality of updated content units;
   receiving, by the processor, an update to the new document from the user;
   updating, by the processor, the new document using the plurality of updated content units, wherein updating comprises refining and enhancing the new document by adding a description of new features and removing a description of the obsolete features from the new document; and
   providing an interactive content management module that enables the user to interactively create and edit the new document in real time using the plurality of updated content units obtained.

2. The method of claim 1, wherein performing comprises:
   receiving an input document, wherein the input document comprises the one or more existing documents, and the new document;
   adding a plurality of additional content units to the input document to form a content unit collection;
   removing, by a content unit mining module, a plurality of common words from the content unit collection, wherein the plurality of common words comprises a plurality of common dictionary words used in the input document in a language of the input document; and
   refining the content unit collection by removing duplicated content units to form the plurality of existing content units when the input document is the one or more existing documents, and the plurality of new content units when the input document is the new document.

3. The method of claim 1, wherein performing content unit mining further comprises:
   storing the plurality of existing content units extracted in a first file database; and
   storing the plurality of new content units in a second file database, respectively.

4. The method of claim 1, wherein the content unit is selected from the group consisting of:
   a single letter;
   combination of letters;
   a number;
   a symbol;
   a subject matter word;
   an acronym;
   a subject matter phrase;
   a subject matter expression;
   a token;
   opcode;
   a system name;
   a subsystem name;
   a device name;
   a components name; and
   combination thereof.

5. The method of claim 1, wherein the content database further comprises:
   a plurality of product documents; and
   a plurality of documents obtained through internet search engines.

6. The method of claim 1, wherein at least one of the existing content units, the new content units or the at least one manually added content unit represent a word history.

7. The method of claim 6, wherein the word history comprises: a single letter, a combination of letters, a number, a symbol, a subject matter word, an acronym, a subject matter phrase, a subject matter expression, a token, an opcode, a system name, a subsystem name, a device name, a component name, or a combination thereof.

8. The method of claim 1, wherein during extraction of the plurality of existing content units and the extraction of the plurality of new content units, purging repeated content units.

9. A computing system, comprising:
   a content database storing a plurality of product documents, a plurality of documents obtained through internet search engines, and a plurality of problem records, wherein each of the problem records comprise customer feedback associated with any of the plurality of documents in the content database, the customer feedback scraped directly from customer emails, blogs, or social media posts;
   a content source selection interface, wherein the content source selection interface enables a user to select one or more existing documents from the content database,
   a content unit mining and extraction module, wherein the content unit mining and extraction module mines and extracts the plurality of existing content units from the one or more existing documents, and the plurality of new content units from the new document;

a content comparison module, wherein the content comparison module compares the plurality of existing content units and the plurality of new content units to obtain the plurality of updated content units; and an interactive content management module, wherein the interactive content management module enables the user to interactively create and edit the new document in real time using the plurality of updated content units obtained;

a memory storing computer executable instructions for the computing system, and a processor, wherein the processor executes the computer executable instructions, the processor operable to:

create a new document;

identify, based on the scraped customer feedback, subject matter areas that require update within the one or more existing documents;

select the one or more existing documents from the content database, wherein the one or more existing documents are related to the new document;

perform content unit mining, using a common dictionary and at least one manually added content unit, on each of the one or more existing documents to extract the plurality of existing content units, and the new document to extract a plurality of new content units, respectively, wherein the at least one manually added content unit is used to add a description of a new feature to the new document or remove a description of an obsolete feature from the new document; and update the new document using the plurality of updated content units, wherein updating comprises refining and enhancing the new document by adding a description of new features and removing a description of the obsolete features from the new document.

10. The computing system of claim 9 further comprising:

a first file database, wherein the first file database stores the plurality of existing content units; and a second file database, wherein the second file database stores the plurality of new content units.

11. The computing system of claim 10, wherein the content unit mining and extraction module:

receives an input document, wherein the input document comprises the one or more existing documents, and the new document;

adds a plurality of additional content units to the input document to form a content unit collection;

removes, by a content unit mining module, a plurality of common words from the content unit collection, wherein the plurality of common words comprises a plurality of common dictionary words used in the input document in a language of the input document; and refines the content unit collection by removing duplicated content units to form the plurality of existing content units when the input document is the one or more existing documents, and the plurality of new content units when the input document is the new document.

12. The computing system of claim 11, wherein the content unit mining and extraction module:

stores the plurality of existing content units extracted in the first file database; and stores the plurality of new content units in the second file database, respectively.

13. The computing system of claim 9, wherein the content unit is selected from the group consisting of:

a single letter;
combination of letters;
a number;
a symbol;
a subject matter word;
an acronym;
a subject matter phrase;
a subject matter expression;
a token;
opcode;
a system name;
a subsystem name;
a device name;
a components name; and
combination thereof.

14. The computing system of claim 9, wherein at least one of the existing content units, the new content units or the at least one manually added content unit represent a word history.

15. The computing system of claim 14, wherein the word history comprises: a single letter, a combination of letters, a number, a symbol, a subject matter word, an acronym, a subject matter phrase, a subject matter expression, a token, an opcode, a system name, a subsystem name, a device name, a component name, or a combination thereof.

16. The computing system of claim 9, wherein during extraction of the plurality of existing content units and the extraction of the plurality of new content units, purging repeated content units.

17. A computer program product for creating and editing documents, the computer program product comprising:

a storage medium readable by a processing circuit and storing instructions for execution by the processing circuit, wherein the computer executable instructions cause the processing circuit to:

receive a new document from a user via an interactive content manager system;

receive a selection of one or more existing documents from a content database from the user via a content source selection interface, wherein the one or more existing documents are related to the new document, wherein the content database comprises a plurality of problem records comprising customer feedback associated with any of the one or more existing documents, the customer feedback scraped directly from customer emails, blogs, or social media posts;

identify, based on the scraped customer feedback, subject matter areas that require update within the one or more existing documents;

perform content unit mining, using a common dictionary and at least one manually added content unit, on each of the one or more existing documents to extract a plurality of existing content units, and the new document to extract a plurality of new content units, respectively, wherein the at least one manually added content unit is used to add a description of a new feature to the new document or remove a description of an obsolete feature from the new document;

compare the plurality of existing content units and the plurality of new content units, to obtain a plurality of updated content units; and receive an update to the new document from the user;

update the new document using the plurality of updated content units, wherein updating comprises refining and enhancing the new document by adding a description of new features and removing a description of the obsolete features from the new document; and provide an interactive content management module that enables the user to interactively create and edit the new document in real time using the plurality of updated content units obtained.

18. The computer program product of claim 17, wherein the computer executable instructions also cause the processing circuit to:
  receive an input document, wherein the input document comprises the one or more existing documents, and the new document;
  add a plurality of additional content units to the input document to form a content unit collection;
  remove, by a content unit mining module, a plurality of common words from the content unit collection, wherein the plurality of common words comprises a plurality of common dictionary words used in the input document in a language of the input document; and
  refine the content unit collection by removing duplicated content units to form the plurality of existing content units when the input document is the one or more existing documents, and the plurality of new content units when the input document is the new document.

19. The computer program product of claim 17, wherein the computer executable instructions further cause the processing circuit to:
  store the plurality of existing content units extracted in a first file database; and
  store the plurality of new content units in a second file database, respectively.

20. The computer program product of claim 17, wherein the content unit is selected from the group consisting of:
  a single letter;
  combination of letters;
  a number;
  a symbol;
  a subject matter word;
  an acronym;
  a subject matter phrase;
  a subject matter expression;
  a token;
  opcode;
  a system name;
  a subsystem name;
  a device name;
  a components name; and
  combination thereof.

\* \* \* \* \*